(12) United States Patent
Narayanam

(10) Patent No.: US 9,400,986 B2
(45) Date of Patent: Jul. 26, 2016

(54) DETERMINING COMMUNITY GATEKEEPERS IN NETWORKED SYSTEMS

(71) Applicant: International Business Machines Corporation, Armonk, NY (US)

(72) Inventor: Ramasuri Narayanam, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 97 days.

(21) Appl. No.: 14/076,829

(22) Filed: Nov. 11, 2013

(65) Prior Publication Data

US 2015/0134807 A1 May 14, 2015

(51) Int. Cl.
 *G06Q 30/02* (2012.01)
 *G06Q 50/00* (2012.01)

(52) U.S. Cl.
 CPC ............ *G06Q 30/0244* (2013.01); *G06Q 30/02* (2013.01); *G06Q 50/01* (2013.01)

(58) Field of Classification Search
 CPC ... H04L 29/08072; H04L 29/06; H04L 43/00; H04L 12/2602; H04L 41/22
 See application file for complete search history.

(56) References Cited

U.S. PATENT DOCUMENTS

| | | | |
|---|---|---|---|
| 7,856,411 B2 | 12/2010 | Darr | |
| 8,130,947 B2 | 3/2012 | Kerschbaum et al. | |
| 8,244,664 B2 | 8/2012 | Ghosh et al. | |
| 8,335,798 B2 | 12/2012 | Achlioptas | |
| 8,375,024 B2 | 2/2013 | Goeldi | |
| 2003/0105973 A1* | 6/2003 | Liang et al. | 713/200 |
| 2007/0226248 A1* | 9/2007 | Darr | 707/102 |
| 2009/0182599 A1* | 7/2009 | Kannan et al. | 705/7 |
| 2012/0204233 A1 | 8/2012 | Rubio | |
| 2012/0278261 A1 | 11/2012 | Lin et al. | |
| 2013/0041860 A1 | 2/2013 | Lawrence et al. | |

OTHER PUBLICATIONS

Jurgens et al. Small Worlds with a Difference: New Gatekeepers and the Filtering of Political Information on Twitter, WebSci'11, Jun. 14-17, 2011.
Foster et al. Gatekeeper Search and Selection Strategies: Relational and Network Governance in a Cultural Market, Poetics 39 (2011) 247-265.
Hulshof, L. Gatekeepers in Innovation Networks, Master Thesis Economic Geography—Faculty of Geosciences, Utrecht University, Aug. 2010.
Hwang et al. Bridging Centrality: Identifying Bridging Nodes in Scalefree Networks, in SIGKDD 2006.

(Continued)

*Primary Examiner* — Vivek Srivastava
*Assistant Examiner* — Hien Doan
(74) *Attorney, Agent, or Firm* — Ryan, Mason & Lewis, LLP

(57) ABSTRACT

Methods, systems, and articles of manufacture for determining community gatekeepers in networked systems are provided herein. A method includes identifying a plurality of groups of nodes in a network system, wherein each of the plurality of groups of nodes includes a given node; measuring a marginal contribution made by the given node to a centrality metric associated with each of the identified plurality of groups of nodes in the network system; and deriving a centrality metric of the given node by averaging the marginal contribution made by the given node across each of the identified plurality of groups of nodes in the network system.

10 Claims, 4 Drawing Sheets

102

1: Let $\hat{\Omega}$ be a set of $t$ randomly sampled permutations. Also let $\pi_j$ be the $j$-th permutation in $\hat{\Omega}$.
2: Also let $R$ be the number of repetitions of the experiment.
3: for $i = 1$ to $n$ do
4:   set $MC[i] \leftarrow 0$
5: end for
6: for $j = 1$ to $t$ do
7:   for $i = 1$ to $n$, do
8:     $MC[i] \leftarrow MC[i] + v_1(S_i(\pi_j) \cup \{i\}) - v_1(S_i(\pi_j))$
9:   end for
10: end for
11: for $i = 1$ to $n$, do
12:   compute $SH_i \leftarrow \frac{MC[i]}{t}$
13: end for
14: Sort the nodes in non-increasing order of their Shapley values

(56) References Cited

OTHER PUBLICATIONS

Aspnes et al. Inoculation Strategies for Victims of Viruses and the Sum-of-Squares Partition Problem, Journal of Computer and System Sciences, 72(6):1077-1093, 2006.

Freeman, Centrality in Social Networks: Conceptual Clarification, Social Networks, 1(3):215-239, 1979.
Borgatti et al. A Graph-Theoretic Perspective on Centrality, Social Networks, 28:466-484, 2005.
Brandes, A Faster Algorithm for Betweenness Centrality, Journal of Mathematical Sociology, 25:163-177, 2001.

* cited by examiner

102

1: Let $\hat{\Omega}$ be a set of $t$ randomly sampled permutations. Also let $\pi_j$ be the $j$-th permutation in $\hat{\Omega}$.
2: Also let $R$ be the number of repetitions of the experiment.
3: for $i = 1$ to $n$ do
4:     set $MC[i] \leftarrow 0$
5: end for
6: for $j = 1$ to $t$ do
7:     for $i = 1$ to $n$, do
8:         $MC[i] \leftarrow MC[i] + v_1(S_i(\pi_j) \cup \{i\}) - v_1(S_i(\pi_j))$
9:     end for
10: end for
11: for $i = 1$ to $n$, do
12:     compute $SH_i \leftarrow \frac{MC[i]}{t}$
13: end for
14: Sort the nodes in non-increasing order of their Shapley values

FIG. 1

DETERMINING COMMUNITY GATEKEEPERS IN NETWORKED SYSTEMS

FIELD OF THE INVENTION

Embodiments of the invention generally relate to information technology, and, more particularly, to networked systems.

BACKGROUND

Significant attention has been paid to the analysis of social networks, particularly with respect to centrality measures. A centrality measure ranks nodes and/or edges in a given network based on the positional power of a node and/or edge or the influence of a node and/or edge over the network. Existing centrality measures, however, are often inadequate to satisfactorily serve the needs of emerging applications.

By way of illustration, consider an example that includes a computer network (such as, for instance, an intranet of a company) wherein the nodes represent workstations and the edges represent connections between the workstations. Also, assume that every workstation in the network can be potentially attacked by a virus which then propagates over the network. Additionally, consider a simple virus propagation model wherein an infected node infects all unprotected nodes (that is, those nodes without anti-virus software) that are reachable from the infected node. In such an example, if the virus spreads from an initial node chosen uniformly at random, a challenge arises in determining on which workstation(s) anti-virus software should be installed, given a limited amount resources.

By way of another example illustration, consider a scenario concerning the spread of misinformation over social media. Particularly, companies may rely on viral marketing of products to maximize revenue. However, in such instances, negative opinions as well as positive opinions may emerge and spread over a network of potential buyers. The company that owns this product will likely want to minimize the loss incurred due to the negative opinions. Therefore, a challenge exists in determining which individual buyers the company should target (for example, for additional convincing or promotion) in order to prevent a maximum number of other individuals from receiving a negative opinion.

SUMMARY

In one aspect of the present invention, techniques for determining community gatekeepers in networked systems are provided. An exemplary computer-implemented method can include steps of identifying a plurality of groups of nodes in a network system, wherein each of the plurality of groups of nodes includes a given node; measuring a marginal contribution made by the given node to a centrality metric associated with each of the identified plurality of groups of nodes in the network system; and deriving a centrality metric of the given node by averaging the marginal contribution made by the given node across each of the identified plurality of groups of nodes in the network system.

In another aspect of the invention, an exemplary computer-implemented method can include steps of identifying a plurality of groups of edges in a network system, wherein each of the plurality of groups of edges includes a given edge; measuring a marginal contribution made by the given edge to a centrality metric associated with each of the identified plurality of groups of edges in the network system; and deriving a centrality metric of the given edge by averaging the marginal contribution made by the given edge across each of the identified plurality of groups of edges in the network system.

Another aspect of the invention or elements thereof can be implemented in the form of an article of manufacture tangibly embodying computer readable instructions which, when implemented, cause a computer to carry out a plurality of method steps, as described herein. Furthermore, another aspect of the invention or elements thereof can be implemented in the form of an apparatus including a memory and at least one processor that is coupled to the memory and configured to perform noted method steps. Yet further, another aspect of the invention or elements thereof can be implemented in the form of means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

BRIEF DESCRIPTION OF THE DRAWINGS

FIG. 1 is a diagram illustrating an algorithm utilized in accordance with an embodiment of the present invention;

DETAILED DESCRIPTION

Figure 2:
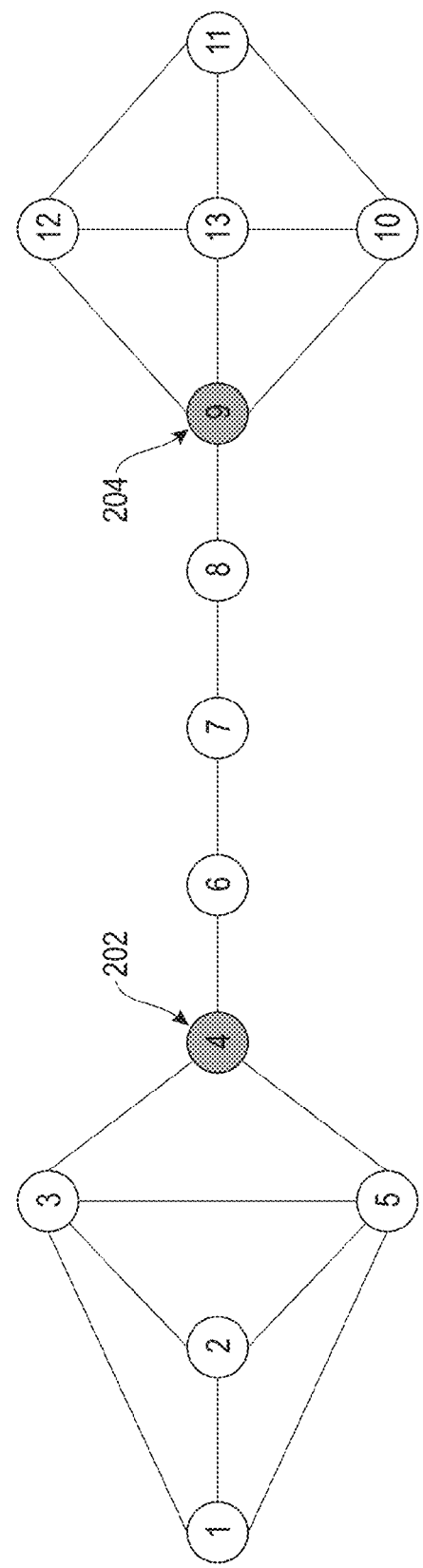
FIG. 2 is a diagram illustrating an aspect of an example embodiment of the invention.

As described herein, an aspect of the present invention includes determining community gatekeepers in social networks. As used herein, a "community gatekeeper" may also be referred to simply as a "gatekeeper." At least one embodiment of the invention includes generating and/or providing a centrality measure to determine gatekeeper nodes in complex social networks.

By way of illustration, an example embodiment of the invention includes consideration of a network of individuals (such as social network of potential buyers, for instance) or a network of objects (such as intranet of a company, for example). Assume, within the context of such an example embodiment, that a certain unwanted process may attack a node uniformly at random and proceed to spread over the network, effecting the function of all reachable nodes and/or individuals. As noted herein, a challenge arises in determining which k nodes of the network to target, given limited targeting resources, to maximize the expected number of nodes in the network that do not receive the unwanted process and/or information.

Accordingly, at least one embodiment of the invention includes deriving a centrality score of node and/or edge of a network system by measuring the power of the node and/or edge independently, as well as by measuring the marginal contribution made by the node and/or edge to the power of a group of nodes and/or edges in the network. By way of illustration of constructing groups of nodes (or edges), assume four nodes, namely {a,b,c,d}. To construct, for example, all groups wherein node "a" is present, (i) consider the set of remaining nodes (that is, {b,c,d}); (ii) form all possible subsets of this set (that is, {b}, {c}, {d}, {b,c}, {b,d}, {c,d}, {b,c,d}); and (iii) add node "a" to each of these subsets (that is, {a,b}, {a,c}, {a,d}, {a,b,c}, {a,b,d}, {a,c,d}, {a,b,c,d}). Additionally:

(i) the marginal contribution made by node "a" to the group {a,b} is determined using the expression: $v(\{a,b\})-v(\{b\})$;

(ii) the marginal contribution made by node "a" to the group {a,c} is determined using the expression: $v(\{a,c\})-v(\{c\})$;

(iii) the marginal contribution made by node "a" to the group {a,d} is determined using the expression: $v(\{a,d\})-v(\{d\})$;

(iv) the marginal contribution made by node "a" to the group {a,b,c} is determined using the expression: $v(\{a,b,c\})-v(\{b,c\})$;

(v) the marginal contribution made by node "a" to the group {a,b,d} is determined using the expression: $v(\{a,b,d\})-v(\{b,d\})$;

(vi) the marginal contribution made by node "a" to the group {a,c,d} is determined using the expression: $v(\{a,c,d\})-v(\{c,d\})$; and (vii) the marginal contribution made by node "a" to the group {a,b,c,d} is determined using the expression: $v(\{a,b,c,d\})-v(\{b,c,d\})$.

At least one embodiment of the invention also includes averaging all of the above marginal contributions made by node "a" in order to compute the gatekeeper centrality of node "a." Additionally, such an embodiment can further include ranking multiple nodes and/or edges based on computed gatekeeper centrality values.

In at least one embodiment of the invention, a value is attached to each subset of nodes that represents how effective this subset is at being gatekeepers. Once the values for the subsets of nodes are determined, at least one embodiment of the invention includes deriving values for individual nodes (within the given subsets) using a Shapley value based approach, as further described herein. These values for individual nodes represent the effectiveness of the given node at being gatekeepers.

Additionally, at least one embodiment of the invention includes modeling gatekeeper centrality using a cooperative aspect and a Shapley value approach to derive the individual node values. The cooperative aspect can be defined, for example, as $\Gamma_i=(N, v_i)$, and additionally detailed as follows. For each $S \subseteq N$, we define $v(S)$ to be $$v_1(S) = \frac{1}{\sum_{i \in \Phi(S)} |C_i|^2},$$

where $\Phi(S)=\{1, 2, \ldots, k\}$ is the set of indices for the k connected components in $G(N\backslash S, E(N\backslash S))$.

The cooperative aspect can also include computing the Shapley values of the nodes that, in turn, represent the gatekeeper centrality values. Because the exact computation of Shapley values is NP-hard, at least one embodiment of the invention can include utilizing a Monte-Carlo simulation based approach to approximately determine the gatekeeper centrality values for the nodes in polynomial time. An example is depicted in FIG. 1, which is a diagram illustrating an algorithm 102 utilized in accordance with an embodiment of the present invention.

FIG. 2 is a diagram illustrating to an aspect of an example embodiment of the invention. By way of illustration, FIG. 2 depicts a plurality of nodes, numbered 1 through 13, wherein node 202 and node 204 (enumerated nodes 4 and 9, respectively) are identified as gatekeeper nodes. In such an embodiment, a Shapley value algorithm (such as depicted in FIG. 1) is executed to determine the gatekeeper centrality values for the given nodes. The resultant Shapley values of the nodes can be ranked in non-increasing order such as follows: $Sh_9=0.135$, $Sh_4=0.102$, $Sh_5=0.085$, $Sh_3=0.085$, $Sh_7=0.071$, $Sh_8=0.071$, $Sh_6=0.071$, $Sh_{10}=0.068$, $Sh_{12}=0.068$, $Sh_{11}=0.068$, $Sh_{13}=0.068$, $Sh_1=0.054$, and $Sh_2=0.054$. Accordingly, for k=2 (that is, available resources limit selection of nodes to two nodes), node 4 and node 9 (components 202 and 204 in FIG. 2, respectively) are identified as the solution using the gatekeeper centrality.

Accordingly, at least one embodiment of the invention includes implementing a game theoretic solution approach to compute the gatekeeper centrality of nodes in one or more given networks. Such an embodiment of the invention can be implemented in various contexts such as, for example, limiting the spread of misinformation in a social network, virus contamination in technological networks, road networks, and co-authorship networks for determining researchers with strong interdisciplinary interests.

Figure 3:
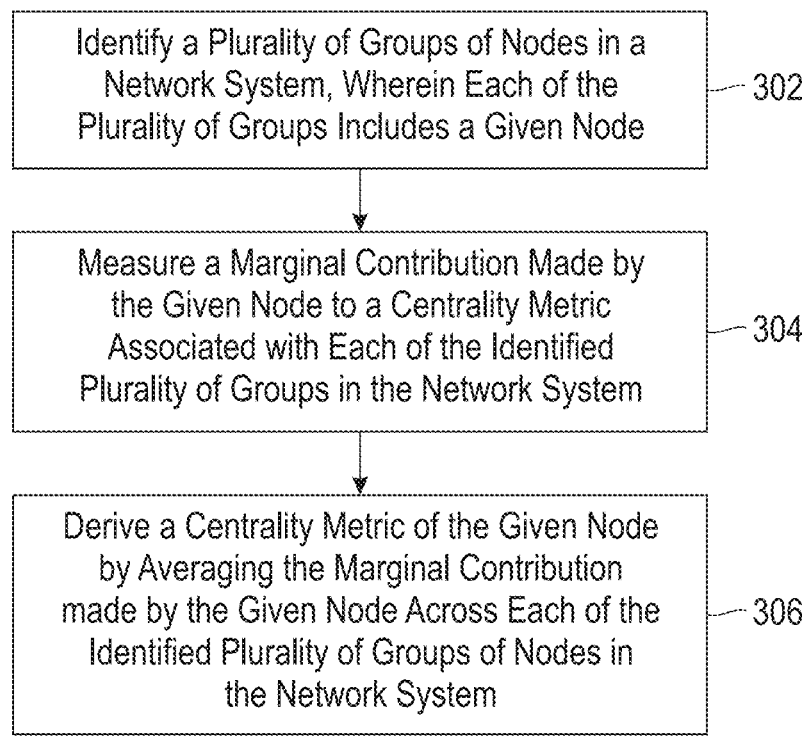
FIG. 3 is a flow diagram illustrating techniques according to an embodiment of the invention.

FIG. 3 is a flow diagram illustrating techniques according to an embodiment of the present invention. Step 302 includes identifying a plurality of groups of nodes in a network system, wherein each of the plurality of groups includes a given node. Step 304 includes measuring a marginal contribution made by the given node to a centrality metric associated with each of the identified plurality of groups in the network system. The said centrality metric associated with each of the identified plurality of groups represents a measure of effectiveness of each of the identified plurality of groups as a gatekeeper in the network system.

Step 306 includes deriving a centrality metric of the given node by averaging the marginal contribution made by the given node across each of the identified plurality of groups of nodes in the network system. The centrality metric of the given node represents a measure of effectiveness of the given node as a gatekeeper in the network system. Additionally, as described herein, the deriving step can include deriving a centrality metric of the given node using a Shapley value based approach.

The techniques depicted in FIG. 3 can additionally include repeating said identifying, said measuring, and said deriving for one or more additional nodes in the network system, and ranking the given node and the one or more additional nodes based on centrality metric. Ranking can include ranking the given node and the one or more additional nodes in decreasing order of centrality metric. Additionally, ranking can include incorporating one or more constraints such as, for example, amount of available resources.

Also, as additionally detailed herein, the techniques depicted in FIG. 3 can be modified to include identifying a plurality of groups of edges in a network system, wherein each of the plurality of groups includes a given edge, measuring a marginal contribution made by the given edge to a centrality metric associated with each of the identified plurality of groups in the network system, and deriving a centrality metric of the given edge by averaging the marginal contribution made by the given edge across each of the identified plurality of groups of edges in the network system.

The techniques depicted in FIG. 3 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an aspect of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 3 can be implemented via a computer program product that can include computer useable program code that is stored in a computer readable storage medium in a data processing system, and wherein the computer useable program code was downloaded over a network from a remote data processing system. Also, in an aspect of the invention, the computer program product can include computer useable program code that is stored in a computer readable storage medium in a server data processing system, and wherein the computer useable program code is downloaded over a network to a remote data processing system for use in a computer readable storage medium with the remote system.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in a computer readable medium having computer readable program code embodied thereon.

An aspect of the invention or elements thereof can be implemented in the form of an apparatus including a memory and at least one processor that is coupled to the memory and configured to perform exemplary method steps.

Figure 4:
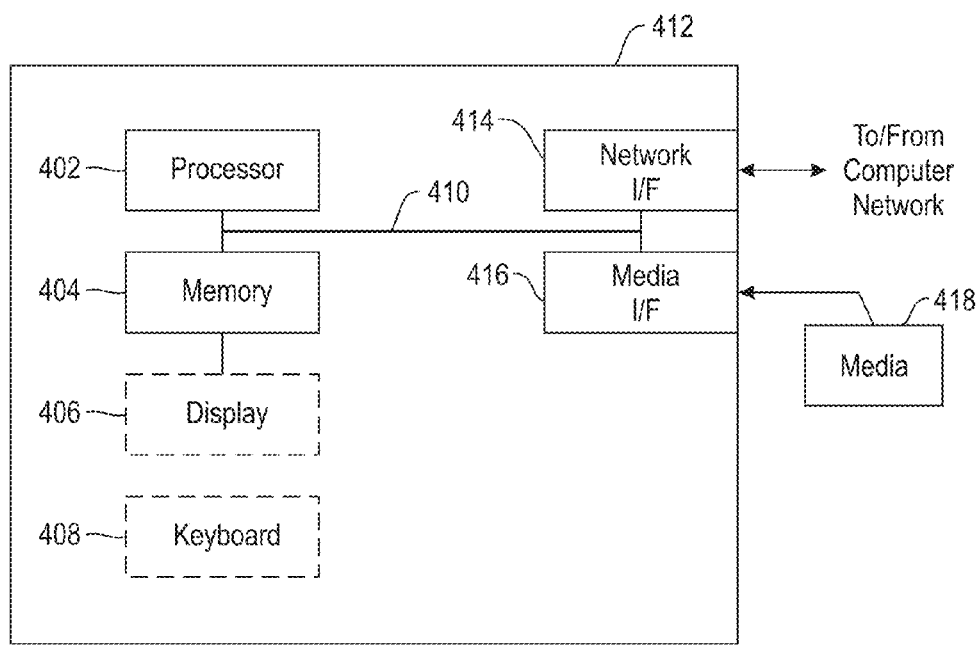
FIG. 4 is a system diagram of an exemplary computer system on which at least one embodiment of the invention can be implemented.

Additionally, an aspect of the present invention can make use of software running on a general purpose computer or workstation. With reference to FIG. 4, such an implementation might employ, for example, a processor 402, a memory 404, and an input/output interface formed, for example, by a display 406 and a keyboard 408. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 402, memory 404, and input/output interface such as display 406 and keyboard 408 can be interconnected, for example, via bus 410 as part of a data processing unit 412. Suitable interconnections, for example via bus 410, can also be provided to a network interface 414, such as a network card, which can be provided to interface with a computer network, and to a media interface 416, such as a diskette or CD-ROM drive, which can be provided to interface with media 418.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 402 coupled directly or indirectly to memory elements 404 through a system bus 410. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including but not limited to keyboards 408, displays 406, pointing devices, and the like) can be coupled to the system either directly (such as via bus 410) or through intervening I/O controllers (omitted for clarity).

Network adapters such as network interface 414 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 412 as shown in FIG. 4) running a server program. It will be understood that such a physical server may or may not include a display and keyboard.

As noted, aspects of the present invention may take the form of a computer program product embodied in a computer readable medium having computer readable program code embodied thereon. Also, any combination of computer readable media may be utilized. The computer readable medium may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM), flash memory, an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using an appropriate medium, including but not limited to wireless, wireline, optical fiber cable, radio frequency (RF), etc., or any suitable combination of the foregoing.

Computer program code for carrying out operations for aspects of the present invention may be written in any combination of at least one programming language, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. Accordingly, an aspect of the invention includes an article of manufacture tangibly embodying computer readable instructions which, when implemented, cause a computer to carry out a plurality of method steps as described herein.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present invention. In this regard, each block in the flowchart or block diagrams may represent a module, component, segment, or portion of code, which comprises at least one executable instruction for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 402. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed general purpose digital computer with associated memory, and the like. Given the teachings of the invention provided herein, one of ordinary skill in the related art will be able to contemplate other implementations of the components of the invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of another feature, integer, step, operation, element, component, and/or group thereof The corresponding structures, materials, acts, and equivalents of all means or step plus function elements in the claims below are intended to include any structure, material, or act for performing the function in combination with other claimed elements as specifically claimed.

At least one aspect of the present invention may provide a beneficial effect such as, for example, providing a centrality measure to determine gatekeeper nodes in complex networked systems.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:

identifying a plurality of groups of nodes in a network system, wherein each of the plurality of groups of nodes includes a given node;

measuring a contribution made by the given node to a metric associated with each of the identified plurality of groups of nodes in the network system, wherein the metric associated with each respective one of the identified plurality of groups of nodes measures an expected number of nodes in the network system, separate from the nodes in the respective group of nodes, that receive transmitted information from the respective group of nodes;

deriving a metric of the given node by averaging the contribution made by the given node across each of the identified plurality of groups of nodes in the network system, wherein said metric of the given node comprises a measure of influence of the given node over the network system;

repeating said identifying, said measuring, and said deriving for each additional node in the network system;

ranking the given node and each additional node in the network system based on the derived metric of each node; and applying a finite amount of network system resources to one or more of the nodes in the network system based on said ranking;

wherein said identifying, said measuring, said deriving, said repeating, said ranking, and said applying are carried out by at least one computing device;

wherein said deriving comprises deriving a metric of the given node using a Shapley value based approach.

2. The method of claim 1, wherein said ranking comprises ranking the given node and the one or more additional nodes in decreasing order of the metric of each node.

3. The method of claim 1, wherein said ranking comprises incorporating one or more constraints.

4. The method of claim 3, wherein said one or more constraints comprises the amount of available resources.

5. An article of manufacture comprising a non-transitory computer readable storage medium having computer readable instructions tangibly embodied thereon which, when implemented, cause a computer to carry out a plurality of method steps comprising:

identifying a plurality of groups of nodes in a network system, wherein each of the plurality of groups of nodes includes a given node;

measuring a contribution made by the given node to a metric associated with each of the identified plurality of groups of nodes in the network system, wherein the metric associated with each respective one of the identified plurality of groups of nodes measures an expected number of nodes in the network system, separate from the nodes in the respective group of nodes, that receive transmitted information from the respective group of nodes;

deriving a metric of the given node by averaging the contribution made by the given node across each of the identified plurality of groups of nodes in the network system, wherein said metric of the given node comprises a measure of influence of the given node over the network system;

repeating said identifying, said measuring, and said deriving for each additional node in the network system;

ranking the given node and each additional node in the network system based on the derived metric of each node; and applying a finite amount of network system resources to one or more of the nodes in the network system based on said ranking;

wherein said deriving comprises deriving a metric of the given node using a Shapley value based approach.

6. A system comprising:

a memory; and at least one processor coupled to the memory and configured for:

identifying a plurality of groups of nodes in a network system, wherein each of the plurality of groups of nodes includes a given node;

measuring a contribution made by the given node to a metric associated with each of the identified plurality of groups of nodes in the network system, wherein the metric associated with each respective one of the identified plurality of groups of nodes measures an expected number of nodes in the network system, separate from the nodes in the respective group of nodes, that receive transmitted information from the respective group of nodes;

deriving a metric of the given node by averaging the contribution made by the given node across each of the identified plurality of groups of nodes in the network system, wherein said metric of the given node comprises a measure of influence of the given node over the network system;

repeating said identifying, said measuring, and said deriving for each additional node in the network system;

ranking the given node and each additional node in the network system based on the derived metric of each node; and applying a finite amount of network system resources to one or more of the nodes in the network system based on said ranking;

wherein said deriving comprises deriving a metric of the given node using a Shapley value based approach.

7. A method comprising:

identifying a plurality of groups of edges in a network system, wherein each of the plurality of groups of edges includes a given edge;

measuring a contribution made by the given edge to a metric associated with each of the identified plurality of groups of edges in the network system, wherein the metric associated with each respective one of the identified plurality of groups of edges measures influence of each of the identified plurality of groups of edges over the network system;

deriving a metric of the given edge by averaging the contribution made by the given edge across each of the identified plurality of groups of edges in the network system, wherein said metric of the given edge comprises a measure of influence of the given edge over the network system;

repeating said identifying, said measuring, and said deriving for each additional edge in the network system;

ranking the given edge and each additional edge in the network system based on the derived metric of each edge; and applying a finite amount of network system resources to one or more of the edges in the network system based on said ranking;

wherein said identifying, said measuring, said deriving, said repeating, said ranking, and said applying are carried out by at least one computing device;

wherein said deriving comprises deriving a metric of the given node using a Shapley value based approach.

8. The method of claim 7, wherein said ranking comprises ranking the given edge and the one or more additional edge in decreasing order of the metric of each edge.

9. The method of claim 7, wherein said ranking comprises incorporating one or more constraints.

10. The method of claim 9, wherein said one or more constraints comprises the amount of available resources.

* * * * *